Figure 1:
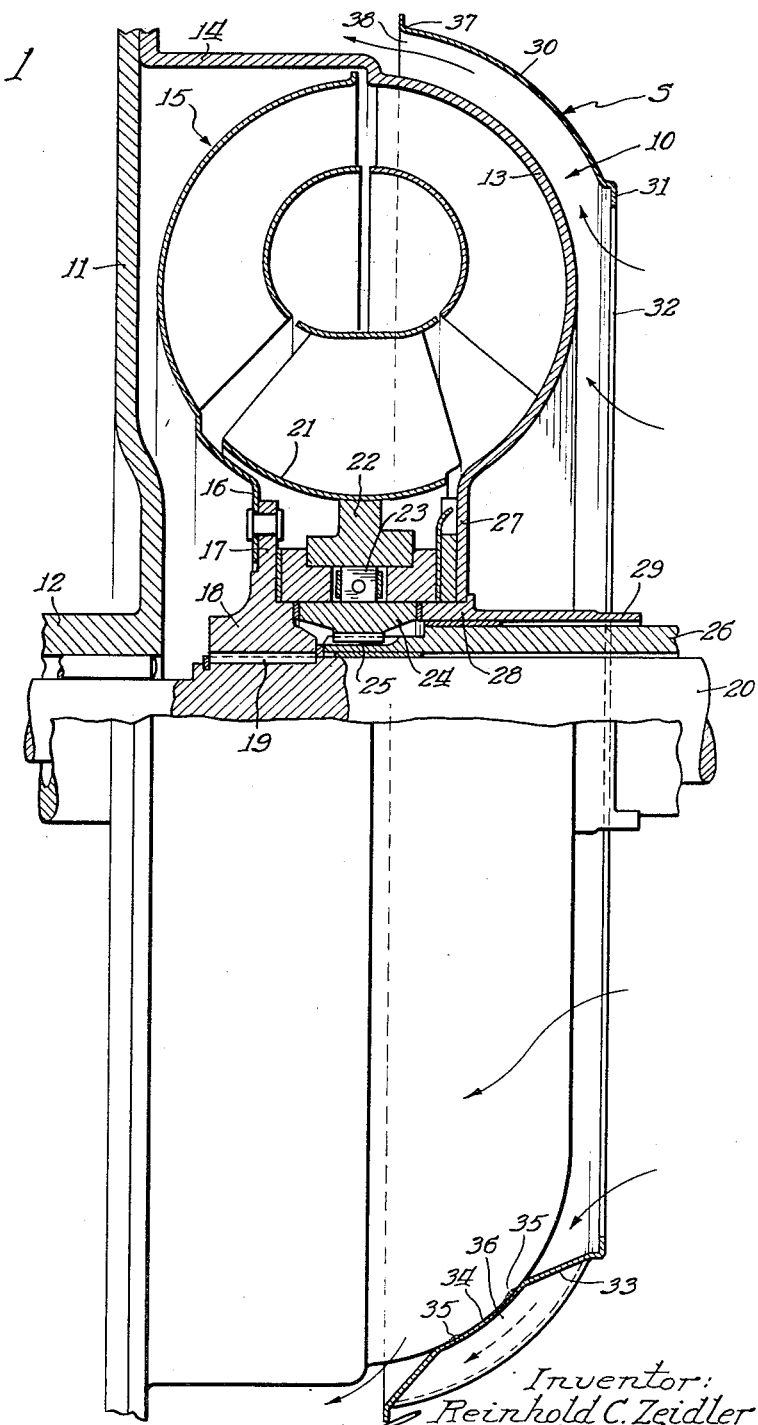

Oct. 26, 1954  R. C. ZEIDLER  2,692,560
COOLING DEVICE FOR HYDRAULIC TORQUE CONVERTERS
Filed Dec. 15, 1950  2 Sheets-Sheet 1

Inventor:
Reinhold C. Zeidler

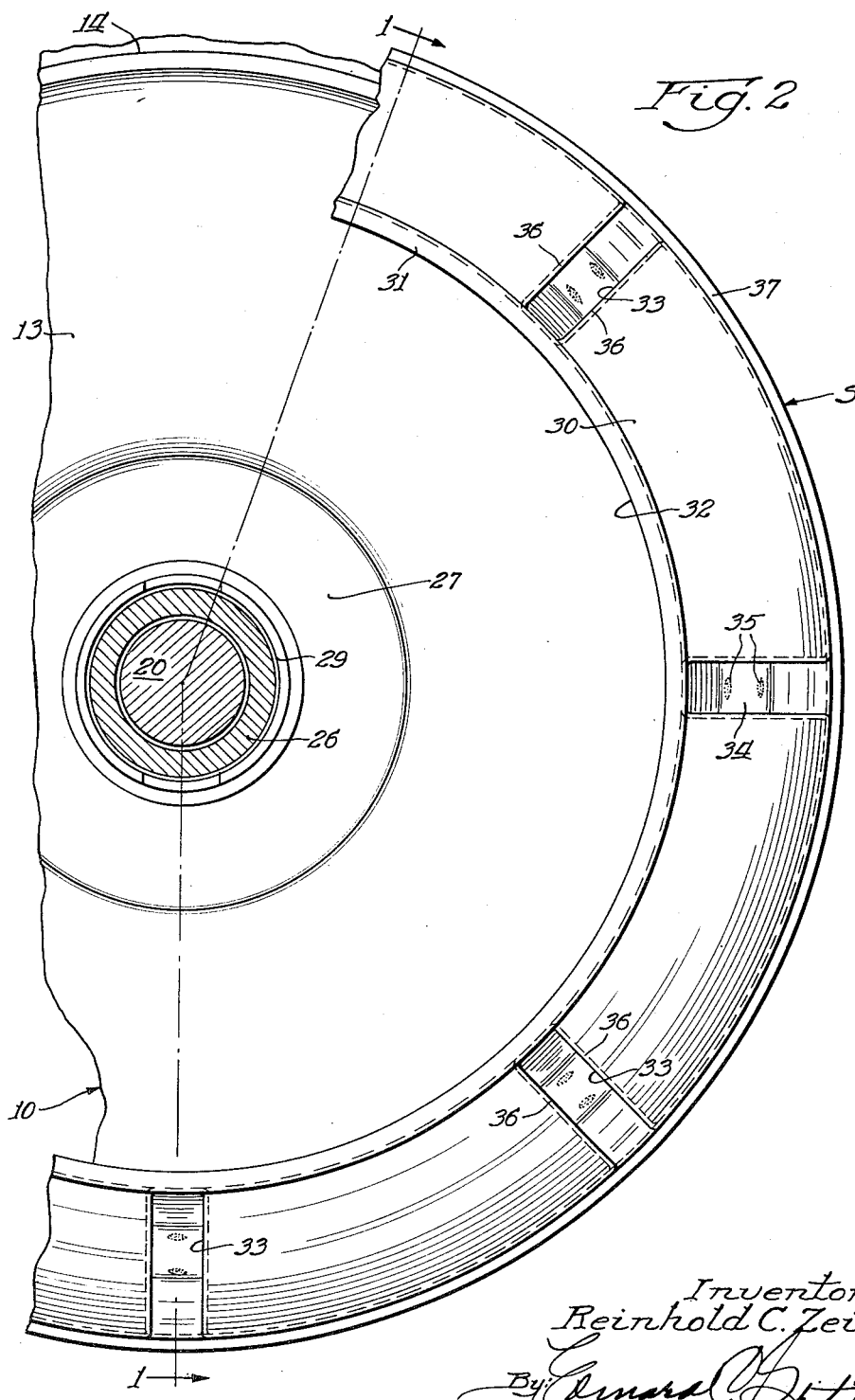

Patented Oct. 26, 1954

2,692,560

UNITED STATES PATENT OFFICE 2,692,560

COOLING DEVICE FOR HYDRAULIC TORQUE CONVERTERS

Reinhold C. Zeidler, Detroit, Mich., assignor to Borg-Warner Corporation, Chicago, Ill., a corporation of Illinois Application December 15, 1950, Serial No. 200,917

1 Claim. (Cl. 103—111)

It is well known that torque converters, and particularly those installed in cooperative association with driving assemblies for automotive vehicles, are inherently subject to heat during operation. Prior efforts to dissipate this heat have not been successful in accomplishing the purpose for which they were designed. Also these structures have been quite expensive to assemble so that they increase the cost of the torque converters. Some of these prior structures are objectionable because of noise created during the operation of the torque converter as well as the rattle of parts of the cooling devices which frequently become loose.

The primary objects of the present improvements contemplate the provision of a blower device that is preferably made of light sheet metal and having embossments therein with wide basal regions which are adapted to be welded to the exterior surface of the torque converter housing. These embossments provide a plurality of fins which, when the torque converter is operating, will create a plurality of coolant air currents in a confined state, and they also direct these air currents into intimate contact with or impingement upon the surface of the housing and thus dissipate the heat. The embossments, which define the above mentioned fins, have a generally U-shape in cross-section, thereby providing wide bases or seats which conform with or are counterparts of the curved surface of the impeller housing against which they are seated and attached, thus affording supporting surface contact of substantial area for each fin. It is also apparent that the fins or embossments provide a plurality of radial passageways for guiding the air currents in the desired directions. Furthermore, the structural details of this blower device are such that it is capable of fabrication as a unitary structure by a single stamping operation on a suitable sheet metal blank.

Additional objects, aims and advantages of the invention contemplated herein will be apparent to persons skilled in the art after the construction and operation of the cooling device for torque converters is understood from the within description. It is preferred to accomplish the numerous objects of this invention and to practice the same in substantially the manner hereinafter fully described and as more particularly pointed out in the claim, reference being made to the accompanying drawings which form a part of this specification.

In the drawings:

Fig. 1 is a side elevation, partly in section, showing the cooling device contemplated herein assembled on a torque converter; and Fig. 2 is a fragmentary rear elevation of the structure shown in Fig. 1, viewed from the right hand side of Fig. 1.

The drawings are to be understood as being more or less of a diagrammatic character for the purpose of disclosing a typical or preferred form of the improvements contemplated herein, and in these drawings the same reference characters identify like parts in the different views.

An example of the torque converter is shown in sectional detail in the upper portion of Fig. 1, and comprises a vaned impeller 10 connected to a flywheel member or other driven element 11 which is secured to and is carried by the end of an engine crankshaft 12. The impeller assembly may be briefly described as comprising a semi-toroidal impeller which is defined by the annular housing 13, preferably made from a heavy sheet metal stamping and having a cylindrical portion 14 extending forwardly from its outer periphery to the flywheel member 11 to which its edge is attached in any suitable manner. This housing and the flywheel member enclose a vaned runner assembly 15 which also is of a semi-toroidal section and has a radial flange 16 extending inwardly and positioned alongside of and secured to a radial flange 17 on a hub 18 which has a splined connection 19 with the adjacent portion of the driven or transmission shaft 20. A vaned stator assembly comprises a shell 21 which has its vanes interposed between the inner edges of the vanes of the impeller and runner assemblies 13 and 15, respectively, and said stator shell 21 is attached to a ring 22 lying between the radially inner regions of the assemblies 13 and 15. This ring 22 provides an outer race for the sprags 23 of a one-way clutch assembly, and a second ring 24 which is concentric with the first ring 22, defines the inner race for said sprags. It will be seen that the inner or second ring 24 has a splined connection as at 25 with the adjacent end of a hollow shaft 26 surrounding the driven shaft 20, and the radially inner region of the impeller housing 13 terminates in a radial flange 27 which is carried by the hub portion 28 at the adjacent end of a tubular member 29 extending rearwardly to and is attached to the transmission casing (not shown).

As is well known, during the operation of torque converters considerable heat is generated due to the rapid rotation of the moving parts thereof and particularly by the impeller assembly. In most of the prior arrangements to dissipate the generated heat have contemplated the provision of a multiplicity of separate thin fins or other blade-like members projecting from the exterior of the impeller housing. In mounting these fins it is necessary to either weld or otherwise secure each individual fin to the outer surface of the impeller housing, which of course requires considerable time and expense. These arrangements have merely resulted in the creation of currents of air which travel generally away from the housing instead of toward the same. The present improvements contemplate the use of a lightweight blower device which is readily installed as a part of the impeller housing for providing air currents that are confined in annular passageways surrounding the impeller assembly between its impeller housing and the shell or body of the blower device. The present arrangement is preferably a one-piece stamping made from lightweight sheet metal and it requires merely a few welding operations to securely mount the same on the impeller housing.

As seen in the drawings, particularly Fig. 1, the shell, which is identified generally as S, has an annular contour and is defined by a wall 30 having a concavo-convex cross-sectional form, the curvature of which is preferably concentric with and is a counterpart of the adjacent region of the impeller housing 13, and it is spaced away from the housing 13 in the manner shown in Fig. 1. The rear portion or inner periphery of the wall 30 has a short, radial flange 31 which defines the limits of an inlet opening 32 having considerable diameter. Spaced around this wall 30, there is a plurality of fins which are defined by forming depressions 33 in the metal blank, and which extend inwardly, so that the inner regions of these depressions have an intermediate portion 34 which is of concave arcuate shape, as shown at the lower portion of Fig. 1. This concave portion provides a seat which fits snugly against the outer surface of the impeller housing 13 to which it is anchored by welding as at 35. The circumferential width of these depressions 33, as seen in Fig. 2, are preferably greater than their radial length, and each depression has parallel side walls 36 which are preferably arranged in radial relation to the axis of rotation of the torque converter. The side walls 36 of the embossments provide excellent fan blades so that during the rotation of the assembly the currents of air are drawn in through the rear inlet opening 32 of the shell S and are brought into intimate contact with and impinge upon the surface of the impeller housing 13. The outer periphery 37 of the shell is spaced from the adjacent portion of housing 13, thus providing an annular outlet opening 38. The embossments divide the space between the shell and housing into a plurality of radial channels through which the coolant air travels in a confined state to impinge directly against the surface of the housing and then be discharged through the outlet opening 38. The embossments are of boxlike form that are open outwardly at the shell and in longitudinal section the depth of each embossment gradually is reduced towards the respective ends at the inner and outer peripheries of the shell. These structural details permit unobstructed access to the bottoms of the embossments which facilitates the insertion of an electrode for welding operations in attaching the blower device to the member to be cooled.

While the improvements have been described in detail in a present preferred form or embodiment, it will be apparent to persons skilled in the art, after understanding the improvements, that various changes and modifications may be made therein without departing from the spirit or scope thereof. It is aimed in the appended claim to cover all such changes and modifications.

What is claimed is:

The combination with a hydraulic torque converter having a rotatable bladed assembly for circulating liquid in said converter and provided with an annular semi-toroidal fluid-containing housing; of an air-blower device for cooling the liquid in said housing, comprising an annular shell flared outwardly between its inner and outer peripheries to define a concavo-convex shape in cross-section and arranged alongside said housing in spaced relation thereto, the inner periphery of said shell being radially outwardly and axially spaced from said housing and the outer periphery of said shell and defining with said shell an inlet opening for cooling air, said outer periphery of said shell defining an outlet opening for the cooling air; and a plurality of elongate hollow embossments formed in said shell extending inward from said shell between its peripheries and anchored to the outer surface of said housing, thereby to define a plurality of passageways for cooling air between said housing and said shell, each embossment being of narrow U-shape section and said embossments projecting toward said housing and extending from the outer periphery of said shell radially inwardly to the inner periphery of said housing, and the bottom wall connecting the side walls of each embossment having a concave surface seated against and secured to the outer surface of said housing, the collective surface areas of said embossment bottom walls engaging said housing comprising less than one-fourth of the surface area of said shell, said shell and embossments being effective to direct air currents in a confined state through said passageways in intimate contact against said housing to dissipate the heat of a liquid therein, said embossments being spaced a substantial distance circumferentially from each other, to provide said passageways of considerable circumferential extent to permit air currents to flow over the major surface area of the housing.

References Cited in the file of this patent

UNITED STATES PATENTS

| Number | Name | Date |
| --- | --- | --- |
| 556,453 | Baldwin | Mar. 17, 1896 |
| 2,156,493 | Durrell | May 2, 1939 |
| 2,328,038 | Taylor | Aug. 31, 1943 |
| 2,340,494 | Smirl | Feb. 1, 1944 |
| 2,556,676 | Carnegie | June 12, 1951 |